United States Patent
Schäfer et al.

(10) Patent No.: US 8,160,379 B2
(45) Date of Patent: Apr. 17, 2012

(54) METHODS AND DEVICES FOR IMAGE PROCESSING WITH HIGHER HARMONICS OF AN ILLUMINATION GRATING

(75) Inventors: Lutz Schäfer, Kitchener (CA); Dietwald Schuster, Bad Abbach (DE)

(73) Assignee: Carl Zeiss Imaging Solutions GmbH (DE)

( * ) Notice: Subject to any disclaimer, the term of this patent is extended or adjusted under 35 U.S.C. 154(b) by 1252 days.

(21) Appl. No.: 11/900,532

(22) Filed: Sep. 12, 2007

(65) Prior Publication Data

US 2008/0069467 A1  Mar. 20, 2008

(30) Foreign Application Priority Data

Sep. 20, 2006 (DE) .......................... 10 2006 044 229

(51) Int. Cl.
*G06K 9/40* (2006.01)
(52) U.S. Cl. ........ 382/260; 382/274; 382/275; 358/3.26; 358/3.27
(58) Field of Classification Search .................. 382/260, 382/274, 275; 358/3.26, 3.27, 463
See application file for complete search history.

(56) References Cited

U.S. PATENT DOCUMENTS

| | | | | |
|---|---|---|---|---|
| 5,426,297 A * | 6/1995 | Dunphy et al. | ........ | 250/227.23 |
| 5,867,604 A | 2/1999 | Ben-Levy et al. | | |
| 5,898,517 A * | 4/1999 | Weis | ................. | 356/5.09 |
| 6,829,397 B2 * | 12/2004 | Wang et al. | ........ | 385/12 |
| 6,909,105 B1 * | 6/2005 | Heintzmann et al. | .... | 250/559.04 |
| 7,009,718 B2 * | 3/2006 | Fujita | .......... | 356/604 |
| 7,053,362 B2 * | 5/2006 | Tobiason et al. | ........ | 250/231.16 |
| 7,376,068 B1 * | 5/2008 | Khoury | ......... | 369/103 |
| 7,623,235 B2 * | 11/2009 | Ho et al. | ......... | 356/328 |

FOREIGN PATENT DOCUMENTS

WO WO 2004/038483 A1 5/2004

OTHER PUBLICATIONS

L.H. Schaefer et al., "Structured illumination microscopy: artifact analysis and reduction utilizing a parameter optimization approach," *Journal of Microscopy*, vol. 216, Nov. 2, 2004, pp. 165-174.
Mats G.L. Gustafsson, "Nonlinear structured-illumination microscopy: Wide-field fluorescence imaging with theoretically unlimited resolution," PNAS, vol. 102, No. 37, Sep. 13, 2005, pp. 13081-13086.
Ben Searle, "Fluorescence Microscopy," Dissertation USU ECE 5930—Introduction to Biophotonics, Apr. 27, 2006.
Rainer Heintzmann et al., "High-resolution image reconstruction in fluorescence microscopy with patterned excitation," Applied Optics, vol. 45, No. 20, Jul. 10, 2006, pp. 5037-5045.

* cited by examiner

*Primary Examiner* — Yosef Kassa
(74) *Attorney, Agent, or Firm* — DLA Piper LLP (US)

(57) ABSTRACT

A method that reconstructs an image function (r), which represents an object function (f) of an object imaged by periodically structured illumination with an illumination grating. It includes: provision of a group of optical sectional images, which are formed after folding operations of the object function (f) with an illumination point spread function ($h_I$), from recorded intermediate images ($g_i$) of the object, wherein the group of optical sectional images contains sub-images ($g_{ck}$, $g_{sk}$) whose contributions in the image function (r) are formed by $k^{th}$ Fourier components (k>1) of the illumination grating, and demodulation of the group of optical sectional images in order to generate the image function (r). Also described are an imaging method and devices in which the reconstruction method is used.

17 Claims, 3 Drawing Sheets

METHODS AND DEVICES FOR IMAGE PROCESSING WITH HIGHER HARMONICS OF AN ILLUMINATION GRATING

RELATED APPLICATION

This application claims priority of German Patent Application No. 10 2006 044 229.6, filed Sep. 20, 2006, herein incorporated by reference.

TECHNICAL FIELD

This disclosure relates to methods for image processing, in particular, to a method for reconstructing images which have been recorded by a microscope with structured illumination, and to an imaging method for microscopic imaging of an object. The disclosure also relates to devices for implementing the aforementioned methods, in particular, to an imaging device such as a microscope, for example, and a reconstruction device for image reconstruction, and to applications of the methods.

BACKGROUND

In optical microscopy, various methods have been developed for the depth-resolved imaging of objects, e.g., to obtain one or more sectional images through a sample. By way of example, in confocal microscopy with confocal, point-by-point illumination and imaging, image information is gathered only in the sectional plane of interest. Disadvantages of confocal microscopy exist in particular due to the complex design of the microscope and the time-consuming way in which the image information is gathered.

Another method is structured illumination microscopy (SIM technique). In this method of wide-field microscopy, a periodic grating structure is focussed into the relevant sectional plane of the sample. By imaging the grating structure of an illumination grating into the sectional plane, a modulation of the illumination in real space is achieved, thereby overcoming the so-called "missing cone" problem of wide-field microscopy. From a plurality of intermediate images recorded in each case with a different phase position of the grating structure, an image function can be calculated which represents an image of the sectional plane in the real object (see, for example, WO 2004/038483 A1). However, conventional structured illumination microscopy has the general disadvantage that the image reconstructed from the intermediate images is an approximation, the quality of which may be limited in particular by artifacts and instabilities.

For the efficient use of illumination gratings for structured illumination, use is usually made of transmission gratings which are formed by sharply defined stripes (so-called "Ronchi Ruling"). Conventional structured illumination microscopy has the general disadvantage that a transmission grating with a relatively large period is often selected for light yield reasons. As a result, the axial resolution can be improved only to a limited extent, although the potential that artifacts will occur is relatively high, depending on the observation point spread function. Another disadvantage is that Fourier components which lie outside the fundamental frequency of the transmission grating generate disadvantageous artifacts in the conventionally calculated optical sections (see L. H. Schaefer et al. in "Journal of Microscopy", Vol. 216, 2004, pages 165-174). It has therefore been found in practice that the quality of image reconstruction may exhibit undesirable limitations, particularly when analysing biological samples. These limitations may be expressed for example in that details of the real sample are imaged only with an insufficient resolution.

It could therefore be advantageous to provide an improved method for image reconstruction from intermediate images of an object imaged with structured illumination, by means of which the disadvantages of conventional techniques are overcome. It could also be advantageous to provide an improved imaging method for obtaining images of objects illuminated with structured illumination and a correspondingly improved imaging device.

SUMMARY

We provide a method for reconstructing an image function (r) which represents an object function (f) of an object imaged by periodically structured illumination with an illumination grating, including providing a group of optical sectional images formed after folding operations of the object function (f) with an illumination point spread function ($h_I$), from recorded intermediate images ($g_i$) of the object, wherein the group of optical sectional images contains sub-images ($g_{ck}$, $g_{sk}$) whose contributions in the image function (r) are formed by $k^{th}$ Fourier components (k>1) of a illumination grating, and demodulating the group of optical sectional images to generate the image function (r).

We also provide an imaging method for obtaining an image function (r) of an object, including periodically structurally illuminating the object, detecting a plurality of intermediate images (g'), determining a group of optical sectional images from the intermediate images ($g_i$), and reconstructing the image function (r) according to the method for reconstructing an image function.

We further provide an imaging device for obtaining an image function (r) of an object, including an image recording apparatus that periodically structurally illuminates the object with an illumination grating and detects a plurality of intermediate images (g'), and a reconstruction apparatus that reconstruct an image function (r), which represents an object function (f) of the object, from the group of optical sectional images which contains sub-images ($g_{ck}$, $g_{sk}$) whose contributions in the image function (r) are formed by $k^{th}$ Fourier components (k>1) of the illumination grating.

We still further provide a microscope including an imaging device.

We further yet provide a reconstruction apparatus adapted to reconstruct an image function (r), which represents an object function (f) of an object, from a group of optical sectional images which contain sub-images ($g_{ck}$, $g_{sk}$) which in the image function (r) are formed by $k^{th}$ Fourier components (k>1) of an illumination grating, including a demodulation circuit adapted to generate the image function (r) from the sub-images ($g_{ck}$, $g_{sk}$).

We also further provide a microscope including a reconstruction apparatus.

We further still provide a computer program product which is located on a computer-readable storage medium, including a program code for implementing the reconstruction method.

We yet further provide a device which includes a computer-readable storage medium which contains program instructions for implementing the reconstruction method.

BRIEF DESCRIPTION OF THE DRAWINGS

Further details and advantages of our methods and devices will be described below with reference to the appended drawings, in which.

DETAILED DESCRIPTION

Figure 1:
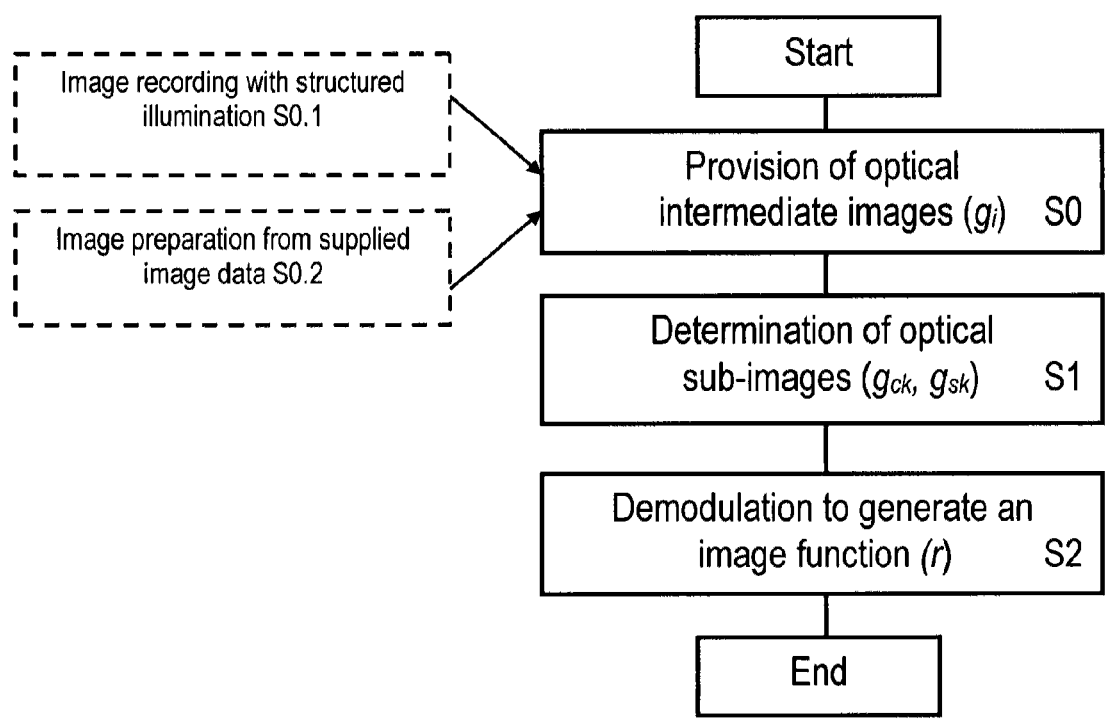
FIG. 1 shows a flow chart to illustrate an image reconstruction method.

In method terms, a first aspect is based on the general technical teaching of reconstructing an image function from optical sectional images which have been determined from an imaging with structured illumination and the contributions of which in the image function are formed by $k^{th}$ Fourier components (k>1) of the illumination grating. Advantageously, the set of optical sectional images due to the higher Fourier components of the illumination grating contains sub-images comprising information about the sample which would otherwise be available only by illuminating with a grating of smaller period, which otherwise possibly could not be used purely for functional reasons (light yield, modulation depth achievable by the illumination point spread function).

We found that the higher Fourier components, which in the conventional calculation of an optical section occurred only as oscillatory interference and were discarded (see the aforementioned publication by L. H. Schaefer et al.), can be taken into account in the reconstruction (demodulation of the sectional images) and give rise to the significant advantages of improved artefact suppression and improved resolution due to a larger amount of information being obtained. The image function calculated represents a much improved approximation of the real object function. Another important advantage uses a coarser grating structure which allows more light through and optionally results in an improved signal-to-noise ratio can be used for the structured illumination if necessary, depending on the application, without impairing the quality of the image reconstruction.

The "object function" ($f$) denotes a real amplitude, dependent on spatial coordinates x and y, of the light (e.g. transmission, reflection or fluorescence) present in the relevant sectional plane of the analysed object (sample). The "image function" ($r$) is the approximation (image) of the object function determined by the reconstruction, and thus the approximation of the object imaged by periodically structured illumination with an illumination grating. The optical sectional images are calculated from "intermediate images" ($g_i$) which are detected with the periodically structured illumination of the object, known per se, with different phase positions of the grating structure. A plurality of intermediate images recorded with different phases of the illumination grating deliver a plurality of optical sectional images. Within this group of optical sectional images, the sectional images formed by the higher Fourier components of the illumination grating are referred to as "sub-images" ($g_{ck}$, $g_{sk}$). The "point spread function" (PSF; Fourier-transformed PSF: Optical Transfer Function, OTF) describes the transmission of the light and optionally of the image information in the optical system which is used for imaging. The "illumination point spread function" describes the transmission of the light from the light source via the grating structure to the sample. The "detection point spread function" describes the transmission of the light from the sample to the camera.

If, the grating period and phase position of the illumination grating are determined from further sub-images ($g_{ck}$, $g_{sk}$) which in the image function ($r$) are formed by basic Fourier components (k=1) of the illumination grating, advantages are obtained in respect of a relatively low calculation complexity during the reconstruction. Advantageously, multiples of the grating period and phase position of the illumination grating can accordingly be used in order to calculate the image function ($r$) from all the sub-images taken into account.

The reconstruction method can be applied with optical sectional images immediately after they have been calculated by microscopic imaging with structured illumination. In this case, the sought image function is advantageously formed directly from the optical sectional images. The reconstruction method can also be applied with optical sectional images which are calculated from stored intermediate images (raw data) from conventional microscopic imagings.

Further aspects are mentioned below in connection with a mathematical description of the image reconstruction.

We provide an imaging method for obtaining an image function of an object, in which a plurality of intermediate images are recorded with a periodically structured illumination of the object in each case with different phases of the grating structure used for illumination, and optical sectional images are calculated from these, wherein the optical sectional images are subjected to the method for reconstructing the image function according to the abovementioned first aspect. By means of the imaging method, advantageously depth-resolved images with an improved image quality can be provided.

We also provide an imaging device which has an image recording apparatus which is adapted for a periodically structured illumination of the object and for detecting a plurality of intermediate images, and a reconstruction apparatus which is adapted to reconstruct an image function which represents an object function of the object. The reconstruction apparatus (reconstruction circuit) contains a demodulation circuit which is adapted to reconstruct the image function, which represents the object function of the object, from the group of optical sectional images which contains sub-images ($g_{ck}$, $g_{sk}$) whose contributions in the image function are formed by $k^{th}$ Fourier components (k>1) of the illumination grating. Preferably, the reconstruction apparatus is designed to implement the image reconstruction method.

The imaging device may be an optical microscope with structured illumination, which is equipped with the reconstruction apparatus.

We also provide devices which thus represent an independent subject matter. Advantageously, a conventional microscope with structured illumination can be retrofitted by simple means with our reconstruction apparatus.

Further independent subject matter includes, but is not limited to, a computer program product on an electronic, magnetic or optical storage medium comprising a program code for implementing the reconstruction method, and a storage medium which contains program instructions for implementing the reconstruction method.

Selected aspects of our methods and devices will be described below with reference to implementing the reconstruction of the image function. Details regarding image recording using a microscope with structured illumination are known per se and therefore will not be explained here.

FIG. 1 shows with steps S0 to S2 the progress of the reconstruction method, the details of which are explained below in connection with the imaging method. The optical sectional images, which form the starting point of the reconstruction, can be calculated directly from intermediate images of an image recording with structured illumination. In this case, the imaging method is carried out with the steps S0.1 to S2. Alternatively, the optical sectional images may be provided by an image preparation consisting of previously recorded and stored intermediate images, in order to apply the reconstruction method on predefined image data (steps S0.2 to S2).

In the imaging method S0.1 to S2, an image recording using the method of structured illumination is first carried out as in the case of conventional techniques. During the image recording, a plurality of intermediate images $g_i$ are first determined in a first sub-step S0.1.

Using a grating structure $s_i$ which is characterized by a spatial frequency $\omega$ and a phase $\phi$ and can be described by $$s_i(x,z)=\delta(z)[1+m\cos(\omega x+\phi_i)] \quad (1)$$

the representation of the intermediate images $g_i$ is obtained with the coordinates $\hat{x}_k=(x_k, y_k, z_k)$ and the differentials d $\hat{x}_k=dx_k dy_k dz_k$, as described by L. H. Schaefer et al. in "Journal of Microscopy" (see above), according to:

$$g_i(\underline{x})=\iiiint f(x_1)|h_D(\underline{x}-\underline{x}_1)|^2 \times \iiint s_i(x-x_0, z-z_0-z_1)|h_I(x_0)|^2 d\underline{x}_0 d\underline{x}_1 \quad (2)$$

($h_I$ and $h_D$: illumination and detection point spread functions) or in a simplified form $$g_i=h_D*(f\cdot[h_I*s_i]) \quad (3).$$

Unlike the conventional approximation $$g_i=h_D*(f\cdot[h_I*s_i])=g_w+g_c\cos\phi_i+g_s\sin\phi_i \quad (4)$$

proposed by L. H. Schaefer et al. in the abovementioned publication, according to the invention the intermediate images are represented by $$g_i = g_w + \sum_k [g_{Ck}\cos(m\varphi_i) + g_{Sk}\sin(m\varphi_i)]. \quad (5)$$

In equation (5), $g_w$ represents the conventional microscopic wide-field image and the optical sectional images $g_{ck}$, $g_{sk}$ represent in particular the sub-images which are determined by the basic Fourier components of the illumination grating (k=1) and by the integer ($k^{th}$) multiples of the Fourier components of the structure of the illumination grating (k>1).

As described in WO 2004/038483 A1 and by L. H. Schaefer et al. in the abovementioned publication, the intermediate images recorded with different phases $\phi_i$ of the illumination grating result in an equation system which, when solved, gives the sought optical sectional images, in particular with the sub-images corresponding to the higher Fourier components of the illumination grating (step S1). Since the vector of unknown variables $(g_w, g_{C1} \ldots g_{CN}, g_{S1} \ldots g_{SN})^T$ in equation (5) is expanded in comparison to the conventional approximation (4), more raw data (intermediate images $g_i$) are accordingly required in order to solve the equation system.

If, for example, at least five intermediate images $g_i$ are recorded with different phases $\phi_i$, then equation (5) results in an equation system from which the optical sectional images $g_{ck}$, $g_{sk}$ can be calculated separately in step S1. The equation system is solved for example by the method described by L. H. Schaefer et al. in the abovementioned publication. The optical sectional images $g_{ck}$, $g_{sk}$ are provided as input variables for the subsequent demodulation (step S2).

A heterodyne demodulation takes place in step S2 to reconstruct the resulting image (of the sought image function), in which the image function (r) is calculated according to $$r = \sum_k w_k [g_{Ck} + jg_{Sk}]e^{j\omega kx} \quad (6)$$

($w_k$: predetermined weights of the $k^{th}$ Fourier components of the illumination grating). The demodulation according to equation (6) is a linear calculation and is therefore used with preference.

The weights $w_k$ result from the Fourier synthesis of the grating form used. In the case of an illumination grating whose transmission curve is represented by a square-wave function with a 1:1 duty cycle, $w_1=1, w_3=3, w_5=5, \ldots$ etc. The 1:1 duty cycle has the advantages of being easy to implement and of simplifying the calculation complexity.

For the demodulation according to equation (6), precise knowledge of $e^{j\omega kx}$, i.e. of the grating period and phase position of each Fourier component of the illumination grating, is required. Preferably, these variables are determined with the required accuracy from the recorded raw data in a first processing step with the grating period of the fundamental frequency (k=1). Since the determination of the grating period and phase position of the fundamental frequency can be formulated as an extremal problem, suitable frequency-sensitive and phase-sensitive cost functions which have the grating period or phase position as a parameter are minimized. With the values thus found for $g_{C1}$ and $g_{S1}$, in a further sub-step the image function (r) is calculated, which also contains integer multiples of the grating period.

Figure 2:
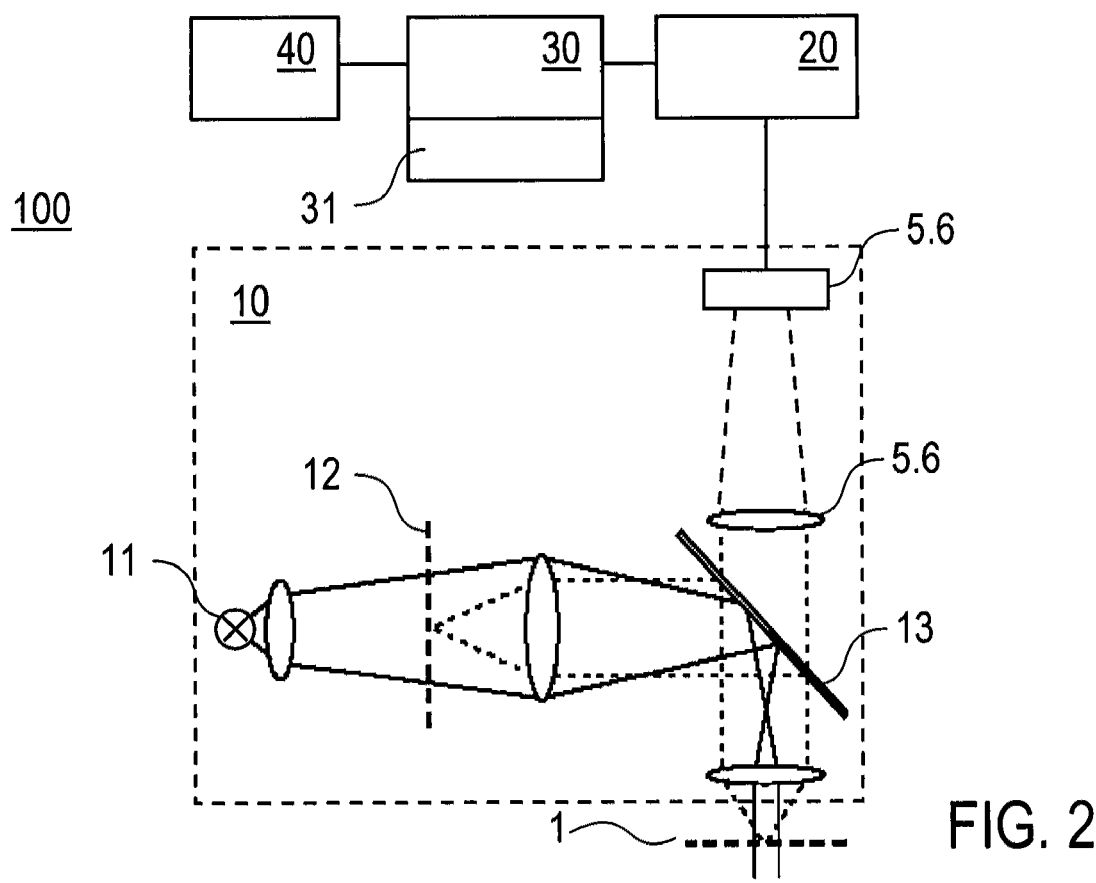
FIG. 2 shows a schematic illustration of an imaging device.
Figure 3:
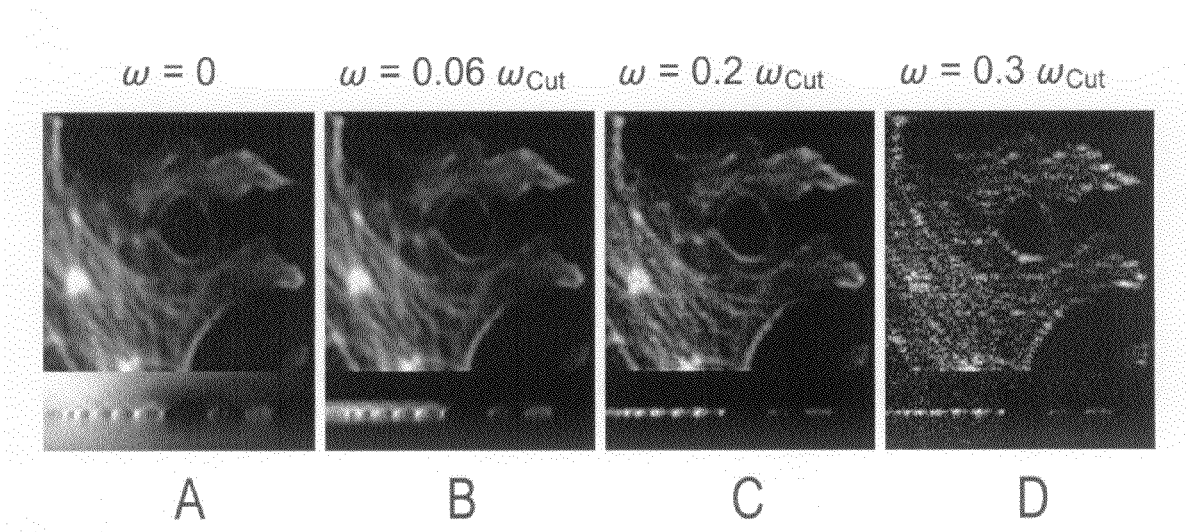
FIG. 3 shows examples of images which show the increase in quality we achieved.

As shown in FIG. 2, the imaging device 100 for obtaining the image function r of an object 1 comprises an image recording apparatus 10 for the periodically structured illumination of the object 1 and for detecting a plurality of intermediate images $g_i$, a sectional image calculator 20 for determining the optical sub-images $g_{ck}$, $g_{sk}$ from the intermediate images $g_i$, and a reconstruction apparatus 30 for reconstructing the image function r, which represents an object function f of the object 1. Optionally, a control and display apparatus 40 is additionally provided. The components 20 to 40 may be provided by one or more computers.

The image recording apparatus 10 comprises a light source 11, a movable grating structure 12, a semi-transparent mirror 13, optical components 14 and a camera 15. These components are known per se from optical imaging systems with structured illumination, and are embodied for example by a microscope with the grating insert and a control system of the ApoTome type (Carl Zeiss AG). The sectional image calculator 20 is for example a calculator circuit by means of which the aforementioned equation system (5) for determining the optical sub-images $g_{ck}$, $g_{sk}$ is solved. The reconstruction apparatus 30 comprises a demodulation circuit 31 for calculating the image function r from the corrected optical sectional images according to equation (6).

FIGS. 3A to 3D show, by way of example and on the basis of measurement results, how the resolution is improved when imaging a sample with each harmonic of the illumination grating additionally taken into account during the reconstruction. The conventional wide-field image (k=0, FIG. 3A) and the image recorded with the conventional demodulation (k=1, FIG. 3B) show only rough outlines of the sample structure, while the image function reconstructed according to the invention with sub-images corresponding to the higher Fourier components of the illumination grating (FIGS. 3C-3D) has a much improved lateral and axial resolution and shows numerous details.

The representative features disclosed in the above description, the drawings and the claims may be important both individually and in combination for implementing our methods and devices.

The invention claimed is:

1. A method for reconstructing an image function (r) which represents an object function (f) of an object imaged by periodically structured illumination with an illumination grating, comprising:
   providing a group of optical sectional images formed after folding operations of the object function (f) with an illumination point spread function ($h_I$), from recorded intermediate images ($g_i$) of the object, wherein the group of optical sectional images contains sub-images ($g_{ck}$, $g_{sk}$) whose contributions in the image function (r) are formed by $k^{th}$ Fourier components (k>1) of the illumination grating, and
   demodulating the group of optical sectional images to generate the image function (r).

2. The method according to claim 1, wherein the sub-images ($g_{ck}$, $g_{sk}$) are components of the intermediate images ($g_i$) according to $$g_i = g_w = \sum_k [g_{Ck}\cos(m\varphi_i) + g_{Sk}\sin(m\varphi_i)].$$

3. The method according to claim 1, wherein the image function (r) is calculated to demodulate the group of optical sectional images according to $$r = \sum_k w_k [g_{Ck} + jg_{Sk}]e^{j\omega kx},$$

wherein $w_k$ comprises predetermined weights of the $k^{th}$ Fourier components of the illumination grating.

4. The method according to claim 3, wherein the illumination grating has a square-wave modulation with a duty cycle of 1:1 and $w_k$=1, 3, 5, . . . for k=1, 3, 5, . . . .

5. The method according to claim 3, in which the demodulation of the group of optical sectional images comprises:
   determining a grating period and phase position of the illumination grating from sub-images ($g_{ck}$, $g_{sk}$) formed in the image function (r) by basic Fourier components (k=1) of the illumination grating, wherein multiples of the grating period and phase position of the illumination grating are used to calculate the image function (r).

6. The method according to claim 5, wherein the grating period and phase position of the illumination grating are determined by minimizing a cost function.

7. The method according to claim 1, wherein the group of optical sectional images is provided directly by an image recording or by an image preparation from supplied image data.

8. An imaging method for obtaining an image function (r) of an object, comprising:
   periodically structurally illuminating the object,
   detecting a plurality of intermediate images (g'),
   determining a group of optical sectional images from the intermediate images ($g_i$), and
   reconstructing the image function (r) according to the method of claim 1.

9. An imaging device for obtaining an image function (r) of an object, comprising:
   an image recording apparatus that periodically structurally illuminates the object with an illumination grating and detects a plurality of intermediate images (g'),
   a sectional image calculator that determines a group of optical sectional images from the intermediate images ($g_i$), and
   a reconstruction apparatus that reconstructs an image function (r), which represents an object function (f) of the object, from the group of optical sectional images which contains sub-images ($g_{ck}$, $g_{sk}$) whose contributions in the image function (r) are formed by $k^{th}$ Fourier components (k>1) of the illumination grating.

10. The imaging device according to claim 9, wherein the reconstruction apparatus has a demodulation circuit that generates the image function (r) from the sub-images ($g_{ck}$, $g_{sk}$).

11. The imaging device according to claim 9, wherein the reconstruction apparatus implements a reconstruction method.

12. The imaging device according to claim 9, wherein the image recording apparatus forms part of an optical microscope.

13. A microscope comprising an imaging device according to claim 9.

14. A reconstruction apparatus adapted to reconstruct an image function (r), which represents an object function (f) of an object, from a group of optical sectional images which contains sub-images ($g_{ck}$, $g_{sk}$) which in the image function (r) are formed by $k^{th}$ Fourier components (k>1) of an illumination grating, comprising a demodulation circuit adapted to generate the image function (r) from the sub-images ($g_{ck}$, $g_{sk}$).

15. A microscope comprising a reconstruction apparatus according to claim 14.

16. A computer program product on a computer-readable storage medium in a non-transitory manner comprising a program code for implementing a reconstruction method according to claim 1.

17. A device which comprises a computer-readable storage medium which contains program instructions for implementing a reconstruction method according to claim 1.

* * * * *

UNITED STATES PATENT AND TRADEMARK OFFICE
CERTIFICATE OF CORRECTION

PATENT NO.         : 8,160,379 B2
APPLICATION NO.    : 11/900532
DATED              : April 17, 2012
INVENTOR(S)        : Schafer et al.

It is certified that error appears in the above-identified patent and that said Letters Patent is hereby corrected as shown below:

In the Specifications:

In Column 5 at line 12

In the formula (1), please change "$\phi_i$" to -- $\varphi_i$ --;
at line 21, at the first occurrence, please change "$x_1$" to -- $\underline{x}_1$ --, and on lines 21 and 22 the following formula (2) should be printed on a single line:

$$g_i(\underline{x}) = \iiint f(\underline{x}_1) h_D(\underline{x} - \underline{x}_1)^2 \times \iiint s_i(x - x_0, z - z_0 - z_1) h_I(\underline{x}_0)^2 d\underline{x}_0 d\underline{x}_1 \quad (2)$$

at line 29, at formula (4) at both occurrences please change "$\phi_i$" to -- $\varphi_i$ --.

In Column 7 at line 25

In the formula please change the second "=" to -- + --.

Signed and Sealed this
Seventh Day of August, 2012

David J. Kappos
*Director of the United States Patent and Trademark Office*